US008840386B2

(12) United States Patent
Anbarasu et al.

(10) Patent No.: US 8,840,386 B2
(45) Date of Patent: *Sep. 23, 2014

(54) MOLD APPARATUS FOR FORMING POLYMER AND METHOD

(75) Inventors: Ramasamy Anbarasu, Bangalore (IN); Ashwit Dias, Bardez (IN); Om Prakash, Bangalore (IN); Daniel Sowle, Dalton, MA (US)

(73) Assignee: Sabic Innovative Plastics IP B.V. (NL)

( * ) Notice: Subject to any disclaimer, the term of this patent is extended or adjusted under 35 U.S.C. 154(b) by 86 days.

This patent is subject to a terminal disclaimer.

(21) Appl. No.: 13/172,139

(22) Filed: Jun. 29, 2011

(65) Prior Publication Data

US 2011/0260366 A1    Oct. 27, 2011

Related U.S. Application Data

(63) Continuation of application No. 12/133,650, filed on Jun. 5, 2008, now Pat. No. 8,021,135.

(60) Provisional application No. 60/942,800, filed on Jun. 8, 2007.

(51) Int. Cl.
*B29C 35/08* (2006.01)
*B29C 33/06* (2006.01)

(52) U.S. Cl.
CPC ......... *B29C 33/06* (2013.01); *B29C 2035/0816* (2013.01); *B29C 35/0805* (2013.01)
USPC .............................................. 425/3; 264/403

(58) Field of Classification Search
CPC .......... B29C 35/08; B29C 43/52; B29C 35/12
USPC .............................................. 264/403; 425/3
See application file for complete search history.

(56) References Cited

U.S. PATENT DOCUMENTS 2,393,541 A    1/1946    Kohler
2,454,847 A    11/1948   Slack, Jr.
(Continued)

FOREIGN PATENT DOCUMENTS

DE    7326694 U     12/1973
DE    2734346 A1    2/1979
(Continued)

OTHER PUBLICATIONS

Japanese Patent No. 2004220309(A); Publication Date: Aug. 5, 2004; Abstract Only; 1 Page.

(Continued)

*Primary Examiner* — Philip Tucker
*Assistant Examiner* — Vicki Wu
(74) *Attorney, Agent, or Firm* — Cantor Colburn LLP

(57) ABSTRACT

Various mold apparatuses and methods for forming a polymer with induction heat energy are provided. In one embodiment of the present invention, a mold apparatus for forming polymer includes a mold having a top mold portion and a top mold surface that is magnetic. The bottom mold portion of the mold includes an induction heating unit that is at least partially embedded in the bottom mold portion that provides induction heat energy to the mold. The mold apparatus is constructed and arranged to dissipate greater than about 50% of the induction heat energy in the top mold portion. The induction heating unit of the bottom portion of the mold provides rapid heating to the top mold surface to provide high surface quality polymer parts and a shorter molding cycle time while utilizing less energy.

16 Claims, 7 Drawing Sheets

(56) References Cited

U.S. PATENT DOCUMENTS

| | | | |
|---|---|---|---|
| 2,508,462 A | 5/1950 | Marshall | |
| 2,705,342 A | 4/1955 | Hendry | |
| 2,796,634 A | 6/1957 | Chellis | |
| 2,979,773 A | 4/1961 | Bolstad | |
| 2,984,887 A | 5/1961 | Theiss | |
| 3,185,432 A | 5/1965 | Hager, Jr. | |
| 3,488,411 A | 1/1970 | Goldman | |
| 3,600,248 A | 8/1971 | Mojonnier et al. | |
| 3,671,168 A | 6/1972 | Nussbaum | |
| 3,691,339 A | 9/1972 | Cachat | |
| 3,763,293 A | 10/1973 | Nussbaum | |
| 3,832,433 A | 8/1974 | Schaffer et al. | |
| 3,974,250 A | 8/1976 | Cottis et al. | |
| 4,044,188 A | 8/1977 | Segal | |
| 4,060,364 A | 11/1977 | Gras | |
| 4,201,742 A | 5/1980 | Hendry | |
| 4,217,514 A * | 8/1980 | Simazaki et al. | 310/260 |
| 4,340,551 A | 7/1982 | Wada et al. | |
| 4,358,306 A | 11/1982 | Okamoto et al. | |
| 4,390,485 A | 6/1983 | Yang | |
| 4,406,703 A | 9/1983 | Guthrie et al. | |
| 4,439,492 A * | 3/1984 | Wada et al. | 428/409 |
| 4,452,943 A | 6/1984 | Goldman | |
| 4,486,641 A | 12/1984 | Ruffini | |
| 4,533,576 A | 8/1985 | Tanahashi et al. | |
| 4,548,773 A | 10/1985 | Suh et al. | |
| 4,563,145 A | 1/1986 | de Meij | |
| 4,716,072 A | 12/1987 | Kim | |
| 4,969,968 A | 11/1990 | Leatherman | |
| 5,041,247 A | 8/1991 | Kim | |
| 5,047,198 A | 9/1991 | Kim | |
| 5,062,786 A | 11/1991 | Arai | |
| 5,064,597 A | 11/1991 | Kim | |
| 5,160,396 A | 11/1992 | Jensen et al. | |
| 5,176,839 A | 1/1993 | Kim | |
| 5,204,181 A | 4/1993 | Suzuki et al. | |
| 5,219,642 A | 6/1993 | Meakin et al. | |
| 5,232,653 A | 8/1993 | Addeo et al. | |
| 5,234,637 A | 8/1993 | Reymann et al. | |
| 5,238,627 A | 8/1993 | Matsuhisa et al. | |
| 5,260,017 A | 11/1993 | Giles, Jr. | |
| 5,272,720 A * | 12/1993 | Cignetti et al. | 373/155 |
| 5,324,473 A | 6/1994 | Baresich | |
| 5,338,497 A | 8/1994 | Murray et al. | |
| 5,362,226 A | 11/1994 | Kataoka et al. | |
| 5,376,317 A | 12/1994 | Maus et al. | |
| 5,410,132 A | 4/1995 | Gregg et al. | |
| 5,416,303 A | 5/1995 | Grooms et al. | |
| 5,458,846 A | 10/1995 | Carroll | |
| 5,489,410 A | 2/1996 | Baumgartner et al. | |
| 5,530,227 A * | 6/1996 | Matsen et al. | 219/633 |
| 5,535,980 A | 7/1996 | Baumgartner et al. | |
| 5,591,369 A | 1/1997 | Matsen et al. | |
| 5,645,744 A | 7/1997 | Matsen et al. | |
| 5,654,246 A | 8/1997 | Newkirk et al. | |
| 5,683,608 A | 11/1997 | Matsen et al. | |
| 5,688,426 A | 11/1997 | Kirkwood et al. | |
| 5,718,863 A | 2/1998 | McHugh et al. | |
| 5,728,474 A | 3/1998 | Niemeyer et al. | |
| 5,762,972 A | 6/1998 | Byon | |
| 5,770,136 A | 6/1998 | Huang | |
| 5,837,183 A * | 11/1998 | Inoue et al. | 264/403 |
| 5,945,042 A | 8/1999 | Mimura et al. | |
| 6,023,054 A | 2/2000 | Johnson, Jr. | |
| 6,176,839 B1 | 1/2001 | Deluis et al. | |
| 6,237,789 B1 | 5/2001 | Zhu | |
| 6,309,582 B1 * | 10/2001 | Wu | 264/403 |
| 6,322,735 B1 | 11/2001 | Yamaki et al. | |
| 6,461,801 B1 | 10/2002 | Wang | |
| 6,759,781 B1 | 7/2004 | Bushko et al. | |
| 6,960,860 B1 * | 11/2005 | DeCristofaro et al. | 310/216.113 |
| 7,132,632 B2 * | 11/2006 | Huang | 219/635 |
| 7,135,653 B2 | 11/2006 | Routberg et al. | |
| 8,021,135 B2 * | 9/2011 | Anbarasu et al. | 425/3 |
| 2002/0031963 A1 | 3/2002 | Mead | |
| 2002/0113066 A1 | 8/2002 | Stark et al. | |
| 2003/0006535 A1 | 1/2003 | Hennessey et al. | |
| 2003/0021917 A1 | 1/2003 | Hotaka et al. | |
| 2003/0038405 A1 | 2/2003 | Bopp et al. | |
| 2003/0091781 A1 | 5/2003 | Arakawa et al. | |
| 2003/0118315 A1 | 6/2003 | Hewak et al. | |
| 2003/0141609 A1 | 7/2003 | Jia | |
| 2004/0041303 A1 | 3/2004 | Kim et al. | |
| 2004/0048463 A1 | 3/2004 | Haematsu | |
| 2004/0058027 A1 | 3/2004 | Guichard et al. | |
| 2004/0129924 A1 | 7/2004 | Stark | |
| 2004/0130057 A1 | 7/2004 | Mehrabi et al. | |
| 2004/0188418 A1 | 9/2004 | Aisenbrey | |
| 2004/0212109 A1 | 10/2004 | Fujimoto et al. | |
| 2004/0222566 A1 | 11/2004 | Park | |
| 2004/0256383 A1 | 12/2004 | Fischer et al. | |
| 2005/0003721 A1 | 1/2005 | Greulich et al. | |
| 2005/0006380 A1 | 1/2005 | Kagan | |
| 2005/0010275 A1 | 1/2005 | Sahatjian et al. | |
| 2005/0011883 A1 | 1/2005 | Clothier et al. | |
| 2005/0035115 A1 | 2/2005 | Anderson et al. | |
| 2005/0179157 A1 | 8/2005 | Muranaka et al. | |
| 2005/0245193 A1 | 11/2005 | Guichard et al. | |
| 2007/0267405 A1 | 11/2007 | Feigen-Blum et al. | |
| 2008/0303194 A1 | 12/2008 | Anbarasu et al. | |
| 2009/0115104 A1 | 5/2009 | Anbarasu et al. | |

FOREIGN PATENT DOCUMENTS

| | | | |
|---|---|---|---|
| DE | 3701387 A1 | 7/1988 | |
| DE | 4337483 C1 | 4/1995 | |
| EP | 0415207 B1 | 2/1995 | |
| EP | 1120219 A1 | 8/2001 | |
| EP | 1275491 A1 | 1/2003 | |
| FR | 2867414 A1 | 9/2005 | |
| GB | 2134839 A | 8/1984 | |
| GB | 2310822 A | 9/1997 | |
| JP | 63078720 A | 4/1988 | |
| JP | 2004220309 A | 8/2004 | |
| WO | 9303080 A2 | 2/1993 | |
| WO | 9413454 A1 | 6/1994 | |
| WO | 9613368 A1 | 5/1996 | |
| WO | 9624413 A1 | 8/1996 | |
| WO | 0208316 A1 | 1/2002 | |
| WO | 02085601 A1 | 10/2002 | |
| WO | 03035351 A1 | 5/2003 | |
| WO | 03043769 A2 | 5/2003 | |
| WO | 2004048463 A1 | 6/2004 | |
| WO | 2005118248 A2 | 12/2005 | |
| WO | 2008154379 A1 | 12/2008 | |

OTHER PUBLICATIONS

Written Opinion of the International Searching Authority; International Application No. PCT/US2008/066116; International Filing Date: Jun. 6, 2008; Date of Mailing: Sep. 15, 2008; 6 Pages.

Interanational Search Report; International Application No. PCT/US2008/066116; International Filing Date Jun. 6, 2008; Date of Mailing Sep. 15, 2008; 6 Pages.

French Patent No. 2867414(A1); Publication Date: Sep. 16, 2005; Abstract Only; 1 Page.

German Patent No. 3701387A1; Publication Date: Jul. 28, 1988; Abstract Only; 1 Page.

Japanese Patent No. 63078720(A); Publication Date: Apr. 8, 1988; Abstract Only; 1 Page.

International Application No. 9512966; Publication Date: May 11, 1995; Abstract Only; Equivalent to DE4337483; 1 Page.

Japanese Patent No. 63078720 (A); Publication Date: Apr. 8, 1988; Machine Translation; 12 pages.

Plastic Technology; vol. 34; Jun. 1988; p. 150.

Polym. Eng. Sci.; vol. 34 (11); 1994; p. 894.

U.S. Department of Energy: Energy Efficiency and Renewable Energy. "Energy Savers: Phenolic Foam Insulation Material" (Feb. 24, 2009). pp. 1-2. Link: http://www.energysavers.gov/your_home/insulation_airsealing/index.cfm/mytopic=11730.

* cited by examiner

MOLD APPARATUS FOR FORMING POLYMER AND METHOD

CROSS REFERENCE TO RELATED APPLICATIONS

This application is a continuation of U.S. application Ser. No. 12/133,650 filed Jun. 5, 2008, now U.S. Pat. No. 8,021,135 which claims priority to U.S. Provisional Application Ser. No. 60/942,800 filed on Jun. 8, 2007, which is incorporated herein by reference.

FIELD OF THE INVENTION

The present invention relates to a mold apparatus for forming polymer into polymer parts and the method of forming polymer parts. More specifically, the present invention relates to a mold apparatus having induction heating capability for forming polymer and a method of forming the polymer by induction heating of the polymer.

BACKGROUND OF THE INVENTION

Conventional techniques molding or forming polymer to produce a desired part involve mold temperatures consistently at or below the ejection temperature of the polymer. It has become increasingly desirable to cycle the mold to a higher temperature to improve physical properties or cosmetics for the desired part. This is done by conducting heat to the outer surfaces of the mold by an internal/external source of heat. This process requires that surface temperatures of the polymer part exceed ejection temperatures of the part. Heating and cooling the mold lengthens the cycle time. Faster heating and cooling cycle times are required for production processes. When higher power densities are applied in response, then larger thermal gradients, which create hot and cold spots on the mold surface, negatively impact the surface appearance and cycle time. Uniform heating is critical to part quality and cycle time.

Induction heating is one approach that has been used to achieve faster heating of the mold. Induction heating occurs by exposing a work piece that is at least partially magnetic to an oscillating magnetic field. The magnetic field is typically produced by passing an alternating current through a conducting coil situated near the work piece. The applied field induces electrical eddy currents in the work piece, and the eddy currents generate heat by resistive effects. Previous methods of forming polymers have employed inductive heating using conductive polymers that include magnetic reinforcements, also known as susceptors, dispersed within the polymer matrix. The induction heating coils heat the conductive polymer matrix disposed between two non-magnetic mold surfaces. A problem with the use of magnetic reinforcements is cost, overheating during processing and adhesion of the parts to the mold cavity.

Other examples of induction heating have employed induction heating elements which are wrapped around a mold body. The mold body is non-magnetic but the mold inserts to which the polymer work piece conforms are magnetic and are heated by the induction heating elements to form the polymer. A problem, however, is that this method can be energy-intensive and it can be difficult to control thermal gradients resulting in "hot spots" along the mold surfaces. Another example of a method of induction heating includes an induction coil that is inserted between the mold halves and which heats the mold while the mold is open and then is retracted before closing the mold to produce the part. A problem is the rate of cooling, as it is very difficult to retract the coil before the mold surface cools below the targeted processing temperature.

Therefore, it is often desirable that polymers, including composite materials, replace metal parts in structural components, such as for example metal body panels in automobiles, to reduce weight and improve fuel efficiency while also meeting demanding structural requirements. Current methods of processing polymers, for example, hand lay-up, vacuum bagging, autoclaving, etc., using reinforced and unreinforced polymers, result in cycle times which are prohibitive and are not being used in higher part volume applications. Additionally, current methods typically use low-pressure processes which often result in surface finishes which are often inconsistent and require significant rework to make a usable part. As a result, current methods do not lend themselves to a high-volume production environment.

SUMMARY OF THE INVENTION

The present invention relates to a mold apparatus and method for forming polymer via induction heating. In one embodiment of the present invention, a mold apparatus for forming polymer includes a mold having a top mold portion and a top mold surface, and a bottom mold portion and a bottom mold surface opposing the top mold surface. The bottom mold portion includes an induction heating unit that is at least partially embedded therein. The top mold surface is a magnetic material which is heated by the induction heating unit located in the bottom mold portion and which causes the polymer to be heated rapidly. The mold apparatus is constructed and arranged to dissipate greater than about 50% of the induction heat energy in the top mold portion. When the top and bottom mold portions are placed together under pressure, the polymer part is formed or molded according to the geometry or configuration of the top and bottom mold surfaces. The close proximity of the induction heating unit to the top mold surface allows for rapid heating and utilizes less energy.

The induction heating unit of the mold apparatus can include one or more coils. The at least one coil can generate heat in a single phase, or in alternative embodiments, can generate heat in multi-phases. The coil design, whether single phase or multi-phase, provides for uniform heat distribution along the top mold surface and results in the production of polymer parts having excellent surface finish.

A method for forming polymer in accordance with the present invention includes placing or injecting the polymer between the top mold surface and the bottom mold surface and heating the top mold surface via an induction heating unit. The top mold surface is heated to a predetermined temperature, for example the heat deflection temperature or the melt temperature of the polymer. Upon reaching the predetermined temperature, the method further includes cooling the polymer in preparation for ejection of the polymer part from the mold. The top and bottom mold surfaces can be further cooled by passing a liquid cooling medium through at least one of the top and bottom and mold portions of the mold. When the top mold surface is cooled to a predetermined ejection temperature, the mold is opened and the formed polymer part is ejected. In another example embodiment, the method further includes passing a gas medium, for example air, through the top and bottom mold portions to purge the liquid cooling medium from the mold during or after ejection of the polymer part. Purging the cooling medium with gas allows the mold to be heated faster during and/or after ejection in preparation for the next polymer part to be formed, thereby reducing cycle time.

BRIEF DESCRIPTION OF THE DRAWINGS

The various embodiments of the present invention can be understood by the following drawings and figures. The components are not necessarily to scale.

DETAILED DESCRIPTION OF THE INVENTION

The present invention provides for a mold apparatus for forming a polymer part via induction heating. Polymer disposed within a mold is formed by inductively heating the mold and the polymer formed by the mold. In one embodiment, one half of the mold which contacts a surface of the polymer includes an induction heating unit which heats the second half of the mold which also contacts another surface of the polymer. The mold apparatus for forming polymer can be used for several types of thermoforming and molding methods. For example, thermoforming methods include vacuum forming, plug assist thermoforming, pressure forming, match metal forming, etc. In addition, the mold apparatus 10 can be used for several types of molding, such as injection molding, compression molding, and plastic stamping.

Figure 1:
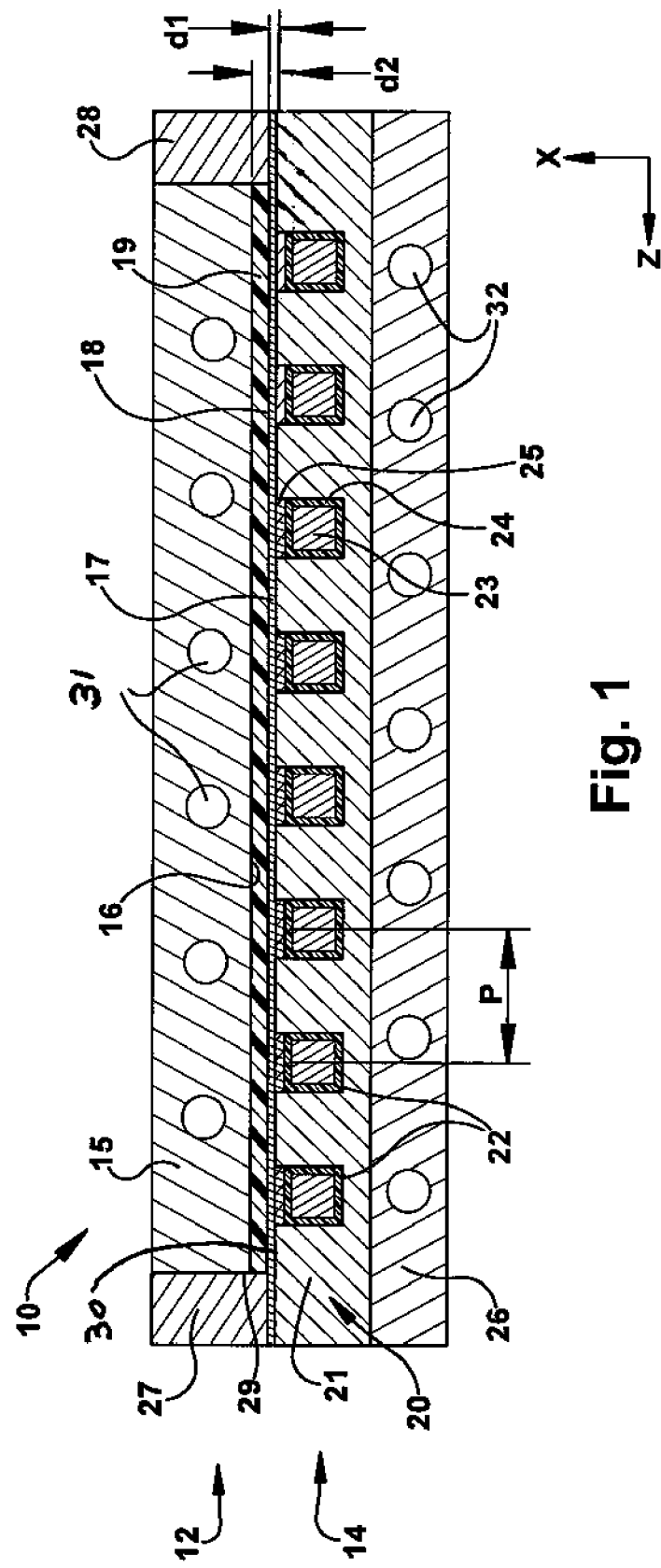
FIG. 1 is a cross-sectional view of the mold apparatus for forming polymer shown in FIG. 1, according to an embodiment of the present invention.
Figure 2:
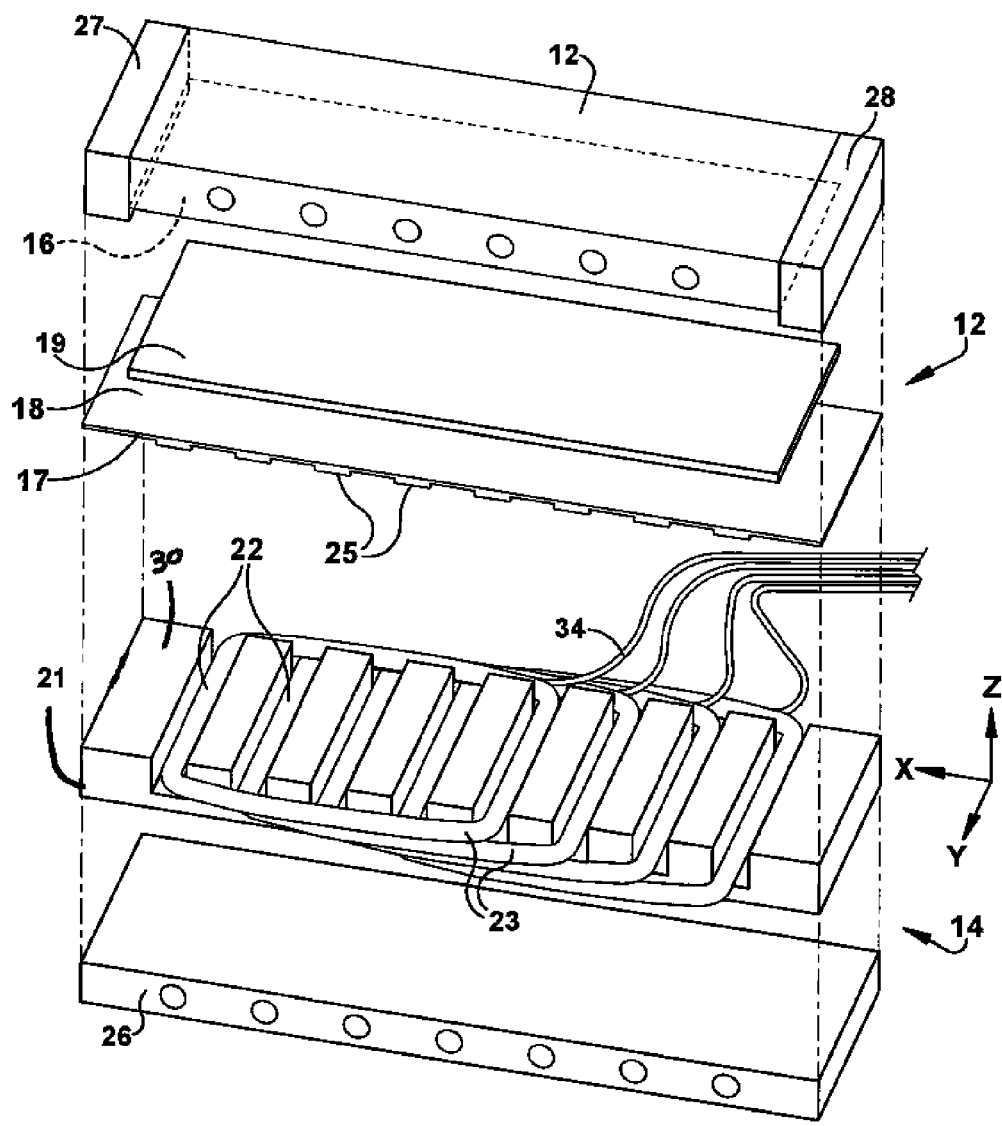
FIG. 2 is a an exploded view of the mold apparatus for forming polymer of FIG. 1, according to an embodiment of the present invention.

FIG. 1 is a cross-sectional illustration of a mold apparatus 10 for heating a polymer. The polymer may be an unfilled, neat resin or it may contain reinforcement fibers and/or mineral reinforcement. The mold apparatus 10 includes a top mold portion 12 and a bottom mold portion 14. The top mold portion 12 has a top mold layer 15 having a top mold surface 16, and the bottom mold portion 14 has a bottom mold layer 17 having a bottom mold surface 18. Top mold surface 16 and bottom mold surface 18 interface with polymer 19. Polymer 19, which can be molten polymer or a polymer work piece for example, is shown pressed between the top mold portion 12 and the bottom mold portion 14 with mold apparatus 10 in a closed position. FIG. 2 is an exploded view of mold apparatus 10 of FIG. 1.

FIGS. 1 and 2 show that the bottom mold portion 14 includes induction heating unit 20 comprising a stator 21 having a plurality of slots 22 and one or more induction heating coils 23 wound around the slots of the stator. Coil 23 is encapsulated by an insulation jacket 24 and is wedged into place within the stator slots 22 by slot insulators 25. Slot insulators 25 can be individual components or can be integral with the bottom mold layer 17, for example, such that slot insulators 25 are downward protrusions of bottom mold layer 17. Coil 23 can be partially or fully embedded within the bottom mold portion 14. Bottom mold portion 14 can optionally include base 26 disposed beneath the stator 21.

The induction heating unit 20 located in the bottom mold portion 14 rapidly heats the top mold surface 16. The material constructions of the top mold surface 16 and the bottom mold surface 18 are different. The top mold surface 16 is made of a magnetic material which is a high eddy current loss or core loss material, whereas the bottom mold surface 18 is made of a low eddy current and hysteresis loss material. Therefore, when current flows through the high-frequency induction heating coils 23, the majority, at least about 50%, of induction heat energy is dissipated by top mold portion 12. Depending upon the construction, arrangement and material composition of the mold apparatus 10, at least about 80% of the power, and in other examples at least about 90% of the heat energy generated by the induction heating unit 20 is applied to the top mold surface 16. That is the majority of the magnetic flux generated by the induction heat unit 20 is caused to magnetically link to the top mold portion 12 and directed to the top mold surface 16.

It should be understood, however, that the present invention pertains to several alternative orientations of the mold, such as a mold apparatus opens along alternative axes, such as vertical or horizontal axes. Also, the induction heating unit need not be located in the lower mold portion 14. In an alternative example embodiment the induction heating unit 20 is located in the top mold portion 12 to rapidly heat the bottom mold surface 18, a magnetic mold surface. In any of the several example embodiments described herein, the mold half or mold portion which supports the induction heating unit heats a magnetic mold surface of the opposing mold portion.

In the embodiment described with respect to FIGS. 1 and 2, top mold surface 16 is heated rapidly to a high temperature, for example at or above the melt temperature of the polymer. The heated polymer then conforms to the geometric shape of the top mold surface 16 to produce the "cosmetic surface" of the polymer part. The cosmetic surface of the polymer part can be extremely high gloss, for example, meeting the standards of a Class A surface finish. The temperature caused by generation of heat in the bottom mold surface 18 is lower, and in some examples, substantially lower than top mold surface 16 and produces a "non-cosmetic" surface of the part where the surface quality is more desirable on one side of the part than the other. Therefore, in one embodiment of the present invention, a mold apparatus having a single-sided induction heating unit, with no induction heating unit in one of the mold portions, can heat the mold surfaces to substantially different temperatures.

Some conventional mold systems have induction coils that surround the mold and heat the mold portions on opposite sides of the polymer. Substantial energy is required to penetrate the mold body and heat the internal mold surfaces to substantially the same temperatures. The present invention allows for a reduction in the input power to the mold apparatus where the induction heating unit is present in one portion of the mold and in close proximity to the top mold surface 16.

Materials used in the top mold layer 15 having top mold surface 16 are magnetic and both electrically and thermally conductive. Magnetic materials are generally defined as having a permeability of greater than about 1.0. The top mold surface 16 of top mold layer 15 has a saturation flux density that is greater than about 0.2 Tesla, in another example greater than about 0.4 Tesla, and in yet alternative examples, ranges from about 0.4 Tesla to about 2.5 Tesla. Magnetic materials include, but are not limited to, iron, steel, carbon, magnesium and alloys thereof. Magnetic materials having high thermal conductivity will improve the heat rate of the top mold surface 16. Examples of magnetic materials used for the top mold surface 16 include, but are not limited to, steel such as, for example H13, S7, 4140, P20, and 400 series Stainless Steel. Such magnetic materials are well known in the art and should be selected to have suitable mechanical strength to withstand the pressure of the polymer forming process. The thickness of the top mold layer 15 is generally greater than about 5 millimeters, and can often range from about 5 millimeters to about 30 millimeters, for example.

The material composition of the bottom mold surface 18 which interfaces with polymer 19 can vary based on the alternative constructions of the bottom mold portion 14. For example, FIG. 1 shows that bottom mold surface 18 is the surface of bottom mold layer 17. In an alternative construction, bottom mold layer 17 is not present and the bottom mold surface 30 is comprised of discrete areas of stator 21 and interposed slot insulator 25 that interfaces with polymer 19. In this arrangement the coils 23 may be in closer proximity to polymer 19 and upper mold surface 16. In any of the alternative constructions of the bottom mold portion 14, however, the bottom mold surface 18 has the mechanical strength to withstand the pressure and resist deformation during the polymer formation process.

The bottom mold surface, whether it is surface 18 of bottom mold layer 17 or surface 30 of stator 21 and slot insulators 25, can be made of a magnetic or non-magnetic material or both. If the bottom mold surface is magnetic, the magnetic material that makes up the bottom mold surface has a saturation flux density that ranges from about 0.4 Tesla to about 2.2 Tesla. Such a saturation flux density enables the majority of the magnetic flux generated by the inductive heat unit 20 to magnetically link to the top mold portion 12 rather than dissipate in bottom mold portion 14. As described above, the bottom mold surface can be the surface 18 of bottom mold layer 17 or the surface 30 of discrete areas of stator 21 and interposed slot insulators 25. Therefore, examples of low power loss materials of bottom mold surface can include, but are not limited to, magnetic materials such as cobalt-based materials, amorphous materials, ceramics, beryllium, and mixtures thereof, as well as non-magnetic materials such as ceramics, glass, wood, polymers, copper, aluminum, and non-magnetic stainless steel such as 300 Series stainless steel, and mixtures thereof, for example.

Stator 21 can be a solid or a laminated magnetic material and may be used to focus the magnetic field to increase the effectiveness of the induction heating by either reducing the required energy or reducing the heating time or both. If laminated, the stator 21 has a series of magnetic layers having a thickness ranging from a few microns to a few hundred microns. Each layer is coated with organic or non-organic electrically insulating material so that the eddy current losses through the stator 21 are low. Materials that can be used for the stator include, but are not limited to, silicon steel, ferrite, permandur, hyperco, amorphous materials, and mixtures thereof, for example.

The slot insulators 25 disposed within slots 22 of stator 21 are made of a non-magnetic material. The non-magnetic material prevents magnetic flux shunting horizontally through stator 21, along the x-axis, between slots 22. The non-magnetic slot insulators 25 therefore channel the magnetic flux produced in the coils 23 and stator 21 to link with the top mold surface 16. Slot insulators can be integral or a separate component from bottom mold layer 17 such that slot insulators 25 are protrusions of layer 17.

The coil 23 is made from solid metallic material, for example copper and aluminum, or other non-magnetic, and electrically conductive material. Coil 23 is electrically insulated from the stator 21 by insulating layer 24. Materials that make up insulating layer 24 include several thermoplastic and thermoset materials and are well known. In an alternative embodiment, the coil 23 is a super conductor. Examples of super conductors include niobium-based materials.

Use of coil conductors with low resistance reduces loss in the coil 23, reduces the cooling requirement, and reduces the power level of the frequency generator. An example of a low resistance coil is Litz wire. Litz wire is comprised of thousands of fine copper wires, each having a small diameter, for example, each strand being about 0.001 inch in diameter, and electrical insulation applied around each strand. Litz wire construction is designed to minimize the power losses exhibited in solid conductors due to the tendency of the high frequency current to concentrate at the surface of the conductor. Litz wire construction counteracts this effect by increasing the amount of surface area without significantly increasing the size of the conductor.

In addition, induction heating unit includes coils made of hollow tubing capable of carrying a cooling medium. The hollow tubing when made of a material that is an electrical conductor, for example copper or aluminum, is capable of carrying sufficiently large currents.

Mold apparatus 10 for forming polymer can optionally include insulators 27 and 28 along the sides of the top mold portion 12. The heat generated in the top mold surface 16, can be lost along the transverse edge 29 of the top mold portion 12 due to a large temperature differential between the mold surface 16 and ambient temperature. Insulators 27 and 28 therefore reduce the heat loss while heating the mold.

Top mold portion 12 and bottom mold portion 14, further include fluid passageways 31 and 32, respectively, cooling the polymer 19 and mold portions 12 and 14 during the method of forming the polymer. For example, a cooling medium can be passed through the fluid passageways 31 and 32 to decrease the cycle time in forming the polymer into a polymer part, as will be further described.

The close proximity of an induction heating unit 20 that is at least partially embedded in the bottom mold portion 14, can effectively heat the polymer while utilizing less power. Embedding the coil in the mold protects the coil from the industrial environment, prolonging the life of the coil and creating a more robust system. Referring to FIG. 1 the stator 21 can be located as close to the top and bottom mold surfaces 16, 18 as possible, such that the magnetic flux from the heating unit 20 will be directed and concentrated in the upper mold surface 16. The distance, $d_1$, between induction heating unit 20 (e.g. top surface 30 of stator 21) and the bottom mold surface 18 can be less than about 30 millimeters, and in another example, can range from about 1 millimeter to about 10 millimeters, and all ranges there between. Depending upon the distance $d_1$ and the thickness of polymer 19, the distance, $d_2$, between the induction heating unit 20, (i.e. along top surface 30 of stator 21) and the magnetic top mold surface 16 is less than about 60 millimeters, and can range for example, from about 1 millimeter to about 25 millimeters and all ranges there between. If the distance $d_2$ between the induction heat unit 20 and top mold surface 16 is too large then the magnetic flux will magnetically link with the top mold surface 16 to adequately heat it. Generally, the smaller the distance $d_2$, which depends at least in part on the size of the gap between the top mold surface 16 and bottom mold surface 18 (distance $d_2$–$d_1$), the lower the volt-ampere requirement to heat the top mold surface 16, assuming constant power dissipation on the magnetic top mold surface 16. If bottom mold layer 17 is not present, then top mold surface 30 is yet closer to top mold surface 16.

In another aspect of the present invention, molding apparatus 10 quickly heats top mold surface 16 in a controlled manner. Heat can be applied uniformly across the magnetic mold surface 16, such that the temperature differential along magnetic top mold surface 16 is relatively constant. For example, the temperature differential at any points along the top mold surface 16 can remain within about 10° C. or less, and in other embodiments about 5° C. or less. A uniform or homogenous temperature along the mold surfaces prevents the occurrence of "hot spots" which are detrimental to the polymer.

Referring to FIG. 1, the induction heating unit 20 in having one or more coils 23 are shown drawn through the slots 22 of stator 21. The coils will generally span the same general surface area as of the top mold surface 16. The pattern of the coils is configured in a variety of three-dimensional geometric arrangements that can conform to the geometry top mold surface 16. As shown, the coils 23 are substantially equidistant from the magnetic mold surface along the Z-axis. The coil pitch, P, is the size of the interval between the coils that corresponds to the width of the slots 22 of stator 21. The dimension of the coil pitch can be adjusted to obtain a homogeneous magnetic flux density distribution in order to achieve and maintain a uniform temperature gradient along the top and bottom mold surfaces 16 and 18.

In another embodiment, the induction heating unit 20 generates heat in multiple phases to distribute the magnetic field substantially evenly along top mold surface 16. The exploded view of FIG. 2 illustrates an induction heating unit 20 which includes a plurality of coils 23 looped transversely through the slots 22 of the stator 21. The coils connect to an induction generator (not shown) via a plurality of leads 34 to supply power to the induction heat unit 20. The coils are distributed spacially and fed from a multi-phase frequency generator whose output voltage phase shifted in time through the various coils. The stator produces a traveling magnetic field, i.e. "traveling wave", that is proportional to supply frequency and inversely proportional to the number of poles arranged in stator. In this manner hot spots are eliminated or minimized.

Figure 3A:
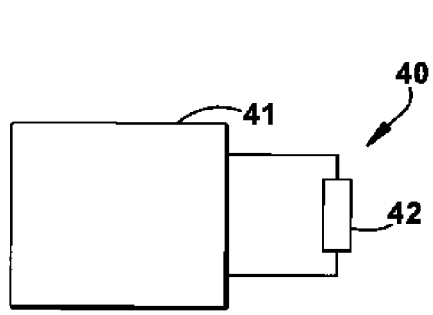
FIGS. 3A-3D show various electrical schematics of the power supply circuit of single and multi-phase systems, according to various example embodiments of the present invention.
Figure 3B:
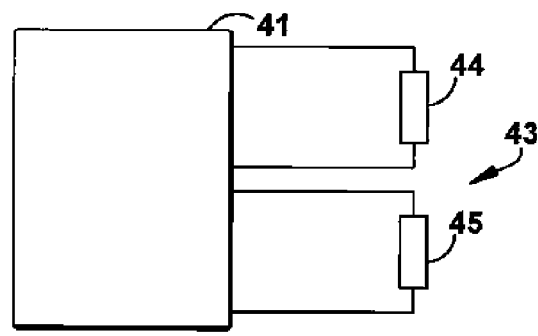
Figure 3C:
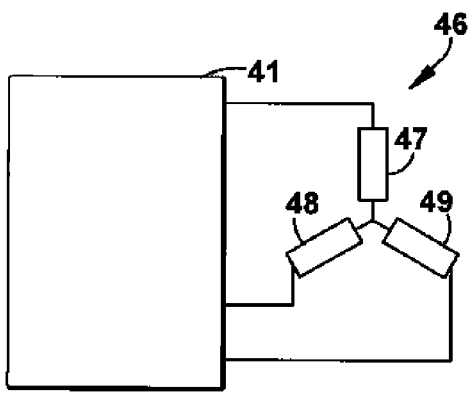
Figure 3D:
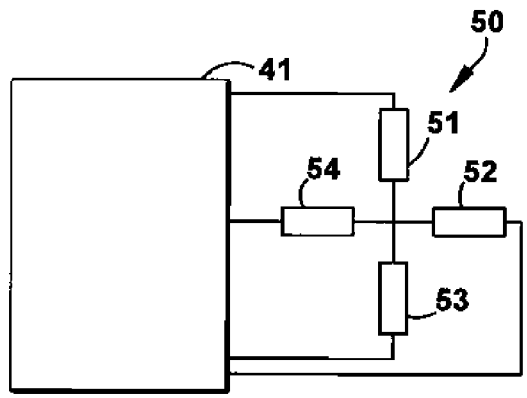

FIGS. 3A through 3D are electrical schematics showing alternative embodiments of the electrical connection between a frequency generator and various example induction heating units which can have one or more poles. In FIG. 3A electrical schematic 40 shows a single-phase coil 42 connected to a single-phase frequency generator 41. Electrical circuit 43 of FIG. 3B is an example embodiment in which two-phase current is supplied by frequency generator 41 to an induction heating unit having two coils, coil 44 and coil 45. Frequency generator 41 supplies two-phase current, for example, phase A to coil 44 and phase B to coil 45, where the current is offset by a phase of 90 electrical degrees. FIG. 3C is an example of a three-phase electrical schematic 46 in which coils 47, 48 and 49, are supplied current in phase A, phase B and phase C, respectively. The coils can be connected in standard electrical star or delta connections and the current is offset by about 120 electrical degrees. In FIG. 3D a four-phase electrical schematic 50 includes induction heating coils 51, 52, 53 and 54 connected to the frequency generator 41, and the currents are phase-shifted by 90 electrical degrees from one another.

The power output by frequency generator 41 is approximately, but not limited to, the sum of power losses in the stator, coils, bottom mold portion 14 and upper mold surface portion 12, assuming losses within the system are minimal. The power output required by the frequency generator 41 therefore depends largely on output voltage, frequency, and material properties (e.g. permeability, resistivity and saturation flux density level) of top mold portion 12, assuming substantially less power loss occurs in the bottom mold portion 14. The power output, in accordance with the example embodiments of the invention herein, is typically less than about 1 megawatt per square meter, in another embodiment, less than about 0.5 megawatts per square meter, and in yet another embodiment, from about 0.01 to about 0.3 megawatt per square meter. For example, if the power output of the frequency generator is about 1 megawatt, then at least about 0.5 megawatt per square meter, in another example, at least about 0.8 megawatt per square meter, and in another example at least about 0.9 megawatt per square meter of power will be dissipated in the upper mold portion 12.

Figure 4:
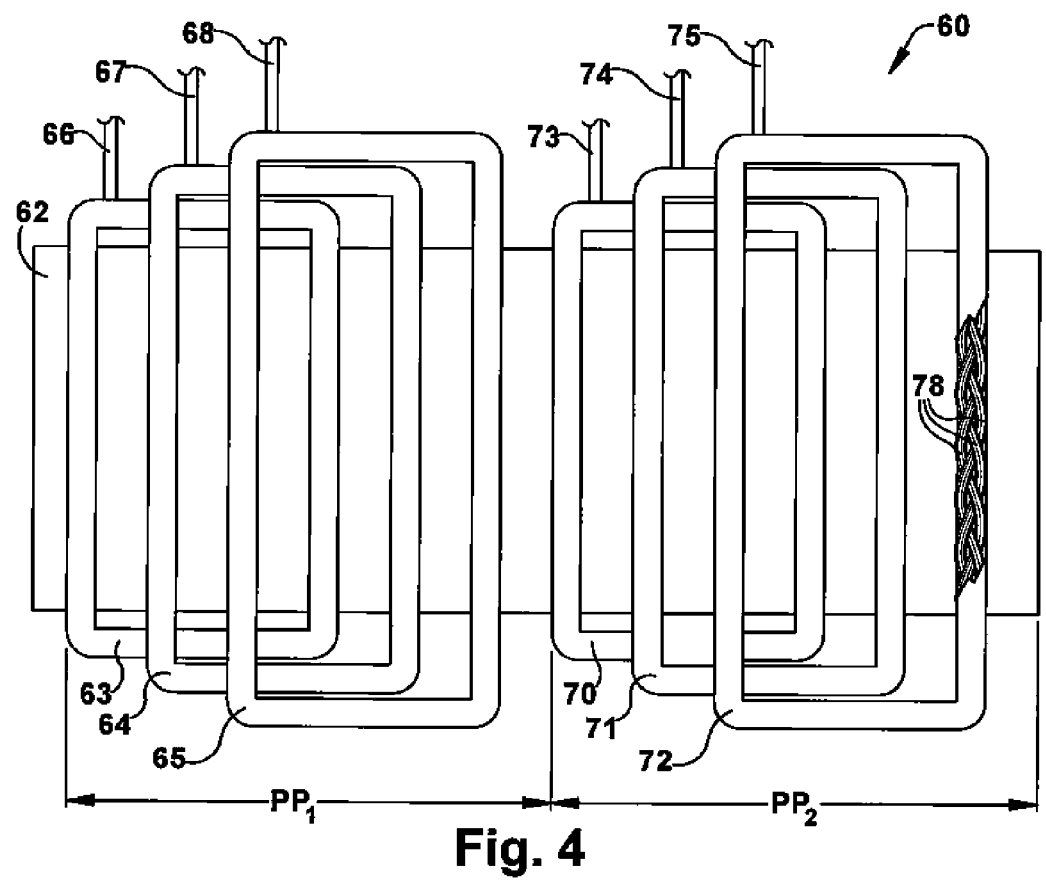
FIG. 4 is a top view of a stator supporting transverse loop induction heating unit of the mold apparatus for forming polymer of FIG. 1, according to an embodiment of the present invention.

FIG. 4 is an example embodiment showing a top view of bottom mold portion 60 of a mold apparatus in which multiple coils of a two-pole induction heating unit are wound around the stator 62 in a transverse loop arrangement, and more specifically, a two-pole, three-phase arrangement. Generally, the higher the number of poles present in the induction heating unit, the more homogenous is the flux distribution produced and the more uniform is the temperature distribution along the top mold surface. The first pole of coils span the stator in the dimension shown as the "pole pitch, $PP_1$, and includes coils 63, 64 and 65 having corresponding leads 66, 67 and 68. A second pole of coils span the stator in the dimension of the second pole pitch, $PP_2$, and includes coils 70, 71, and 72 having corresponding leads 73, 74, and 75, respectively.

Coils along the first pole pitch $PP_1$ can be connected to coils of the second pole pitch $PP_2$ to form a multi-phase, multi-pole coil so that the number of electrical leads or connecting wires required for connecting with frequency generator will be low. Several alternative wiring arrangements between the coils are possible. For example, in a three-phase configuration coils 63 and 70 can have the same current form, Phase A, and the same value of phase current passing through them. Coils 64 and 71 can have the same current form, Phase B, and coils 65 and 72 can have the same current form, Phase C. The coils 63 and 70, 64 and 71, 65 and 72 can be electrically connected in series or parallel combination. These electrically connected coils are then connected to a three-phase frequency generator.

In the above example of three-phase system, there is one coil in a separate phase in each pole. For example coils 63, 64, 65 described above are supplied current in different phases along the first pole pitch $PP_1$ and coils 70, 71 and 72 are supplied current in different phases along the second pole pitch $PP_2$. In another embodiment first pole pitch, $PP_1$ can have multiple coils connected to each other in one or more phases. For example each of the coils 63, 64, 65, which are supplied current in Phases A, B, and C, respectively, can be connected in series to at least one or more additional coils (not shown). That is, coil 63 is connected in series to at least one other coil (not shown) and is supplied current in Phase A, coil 64 is connected in series to at least one other coil (not shown) and is supplied current in Phase B, and coil 65 is connected in series to at least one other coil (not shown) and is supplied current in Phase C. A corresponding coil arrangement with coils 70, 71, and 72 each connected in series to additional coils (not shown) can be supplied current in Phase A, B, and C accordingly along the second pole pitch $PP_2$. It should be understood that the above examples constitute a few of several alternative arrangements having multiple generators, additional poles, current phases and coils that can be utilized in the induction heating system of the mold apparatus for forming polymer.

The speed of traveling magnetic field over the mold is frequency of supply to 21 and inversely proportional to number of poles form by the coils in 21. The eddy current power loss which is responsible for heating mold 16 is proportional to square of flux density and square of supply frequency. It means that the frequency requirement is higher for maintaining the same traveling wave speed when number of poles is increased.

FIG. 4 also illustrates an embodiment of a mold apparatus in which the stator 62 is slot-less. In such case the coils can be adhered firmly to the stator with an adhesive, or alternatively, the coils may be secured to the stator via a suitable mechanical arrangement on the top surface of the stator. Materials and components used to secure the coils are likewise made of a non-magnetic material or a magnetic material that is not thermally conductive as described above with respect to the materials used in the bottom mold portion 14 (FIG. 1). The cut-away portion of coil 72 shows that the coil can be made up of a plurality of coil bundles 78, for example bundles of Litz wire, in addition to a single conductor.

Figure 5:
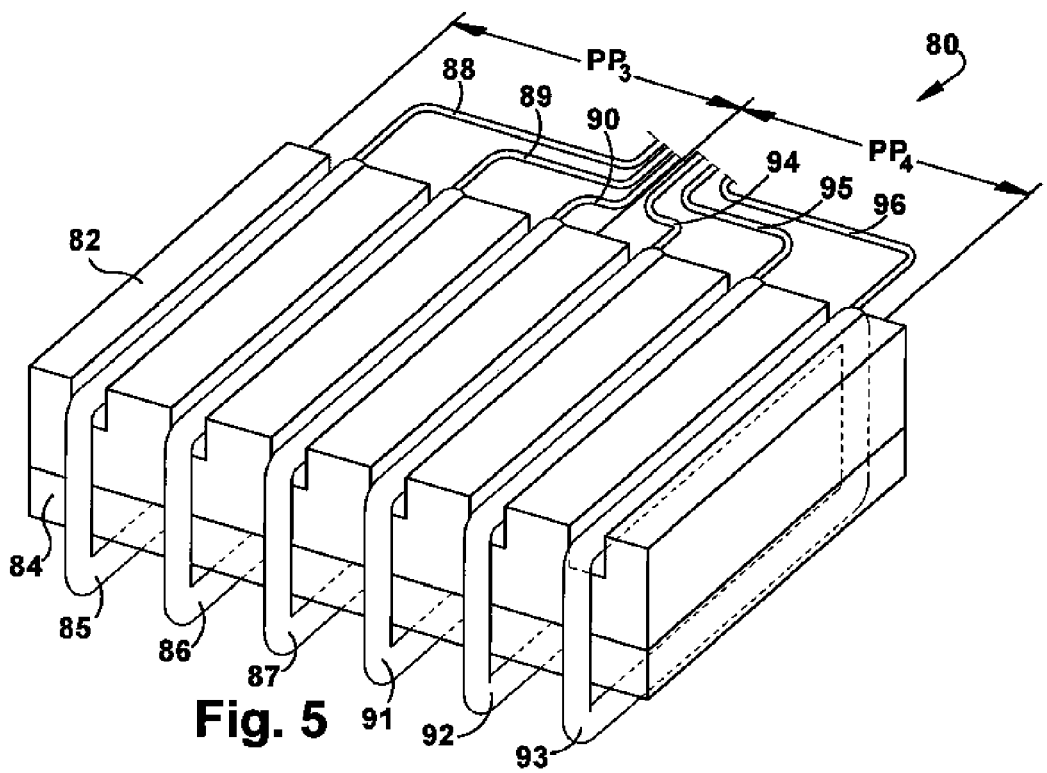
FIG. 5 is a perspective view of a stator supporting vertical loop induction heating unit of the mold apparatus for forming polymer of FIG. 1, according to an embodiment of the present invention.

FIG. 5 is an example embodiment showing a perspective view of a bottom mold portion 80 of a mold apparatus in which multiple coils of a two-pole induction heating unit are wound around the stator 82 and optional base 84 in a vertical loop arrangement. Stator 82 has six slots and each slot has one coil in a 2-pole, 3-phase winding configuration. For example, coils 85 and 91 (having leads 88 and 94, respectively) can be supplied current in Phase A, coils 86 and 92 (having leads 89 and 95, respectively) can be supplied current in Phase B, and coils 87 and 93 (having leads 90 and 96, respectively) can be supplied current in Phase C. Coils 85 and 91, 86 and 89, 87 and 90 are connected, either in series or parallel, to produce two-pole configuration connected to frequency generator. In another example, if the number of slots is 12, a 4-pole, 3-phase winding configuration can have one coil per phase per pole.

The coils, which are arranged in a vertical loop about the stator 82, can generate heat build-up due to the magnetic flux produced by the coil along the bottom of stator 82. Heating of stator 82 can be reduced either by creating large air gap between the coils and the stator, or by placing base 84 which is a non-magnetic material, for example aluminum or copper, to suppress the flux between the coils and the stator 82. Along sharp corners the flux density is generally higher and thus the heating is increased. The corners can have a radius or chamfer to reduce the flux density levels.

Figure 6:
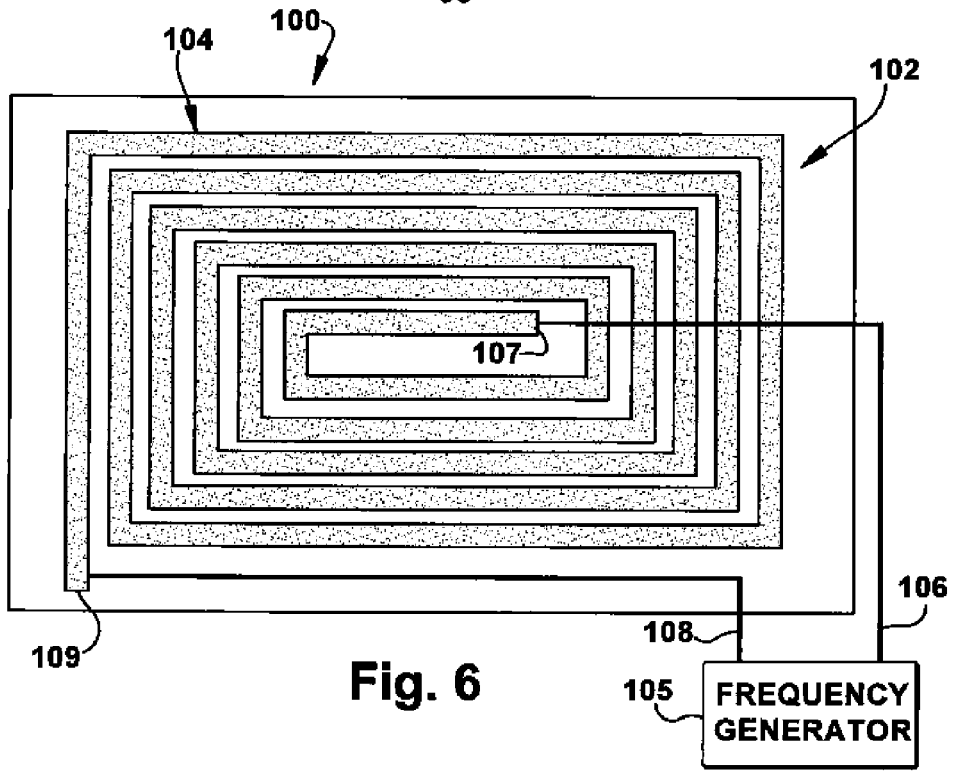
FIG. 6 is a top view of an induction coil design, according to an embodiment of the present invention.

FIG. 6 is a top view of bottom mold portion 100 having a stator 102 and coil 104 is electrically connected to frequency generator 105. Induction heating unit that includes coil 104 can be at least partially embedded in the stator 102 and is electrically insulated from the stator. This spiral coil is a single-phase coil that attaches electrically connected to frequency generator along lead 106 to the end 107 and lead 108 that connects to the end 109 of coil 104. It has been found that in some applications, a spiral coil design can provide a substantially equal distribution of magnetic flux along the top mold surface (not shown) while generating heat using a single phase.

Figure 7:
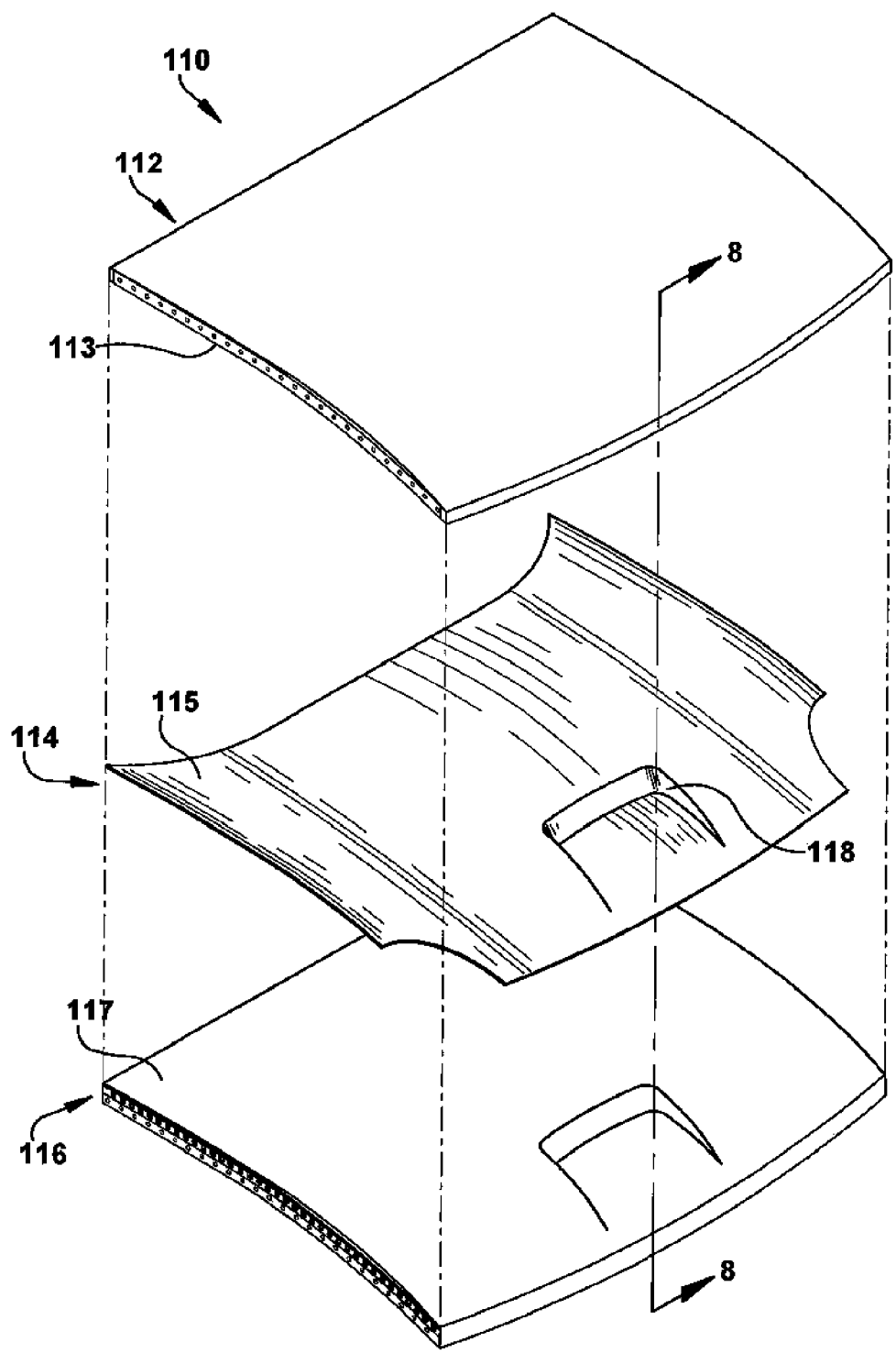
FIG. 7 is an exploded view of a mold apparatus for forming polymer illustrating the geometric shapes of the opened mold portions and the polymer part formed therefrom, according to an embodiment of the present invention.

FIG. 7 is an exploded view of mold apparatus 110 having a top mold portion 112 and a bottom mold portion 116 which form polymer part 114, for example, an automotive hood. The induction heating of top mold surface 113 produces a highly finished cosmetic surface 115 of the polymer part. The induction heating unit is located within the bottom mold portion 116 below the bottom mold surface 117. Therefore, induction heating can be used to generate relatively large parts that are made of polymer that include fillers and fiber reinforcements. The uniform heating of the induction heating unit along the surface of the magnetic mold surface 113 can produce a polymer part with cosmetic surface 115 that is a Class A finish free of voids and imperfections. Excellent molding finishes can also be produced in geometrically detailed or intricate portions of the polymer part, for example the detailed angular design portion 118 of part 114.

Figure 8:
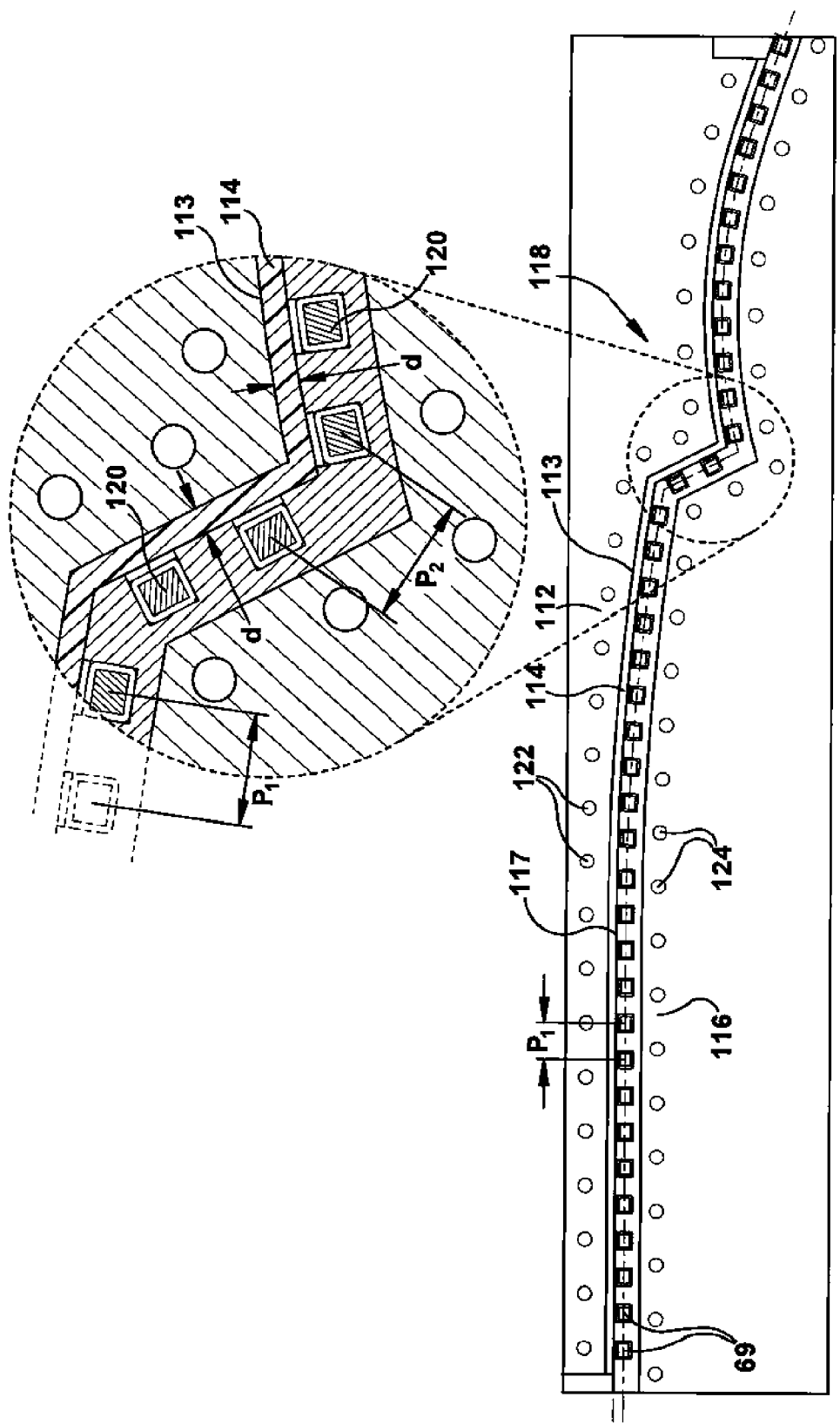
FIG. 8 is a cross-sectional view taken along lines 8-8 of the mold apparatus for forming polymer shown in FIG. 7, according to an embodiment of the present invention.

FIG. 8 is a cross-sectional view taken along lines 8-8 of the mold apparatus of 110 of FIG. 7. The cross-section shows the upper mold portion 112 that has a magnetic mold surface 113 and bottom mold portion 116 with having bottom mold surface 117 and polymer part 114 between magnetic mold surface 113 and a bottom mold surface 117. Bottom mold portion 116 also includes stator 118 that supports induction heating coils 120. Top and bottom mold portions 112 and 116, respectively further include fluid passageways 122 and 124 for purposes of cooling the mold.

The geometry of the polymer part 114 shows a general angular design portion 118. The expanded view of the angular design portion 118 shows that the spacing between the coils 120, or the slot pitch varies with the geometry. For example, the slot pitch $P_1$ along the portion of the polymer 114 that is substantially planar is less than the slot pitch, $P_2$ that is along the angular design portion. The slot pitch is varied so that the magnetic field is distributed substantially even along the part and that hot spots along the surface of the magnetic mold surface 113 and the top mold surface 117 are minimized. The expanded view also shows that the induction heating unit are located at a substantially equal distance, d, from the magnetic top mold surface 113 along the axis throughout the length of the part.

By using induction heating, the present invention is able to reduce heating time without the large temperature gradients of conventional processes. Consequently, composite laminates can be quickly cured without excessive voids and post-cure delaminations. The use of induction heating also produces short cycle times because the mold surface is directly heated rather than the entire mold body. The instantaneous heating heats a thin layer of the mold without heat being conducted throughout the interior of the mold and therefore enabling prompt cooling. Therefore, the present invention provides a method in which a higher surface quality of molded articles can be achieved and in a shorter molding cycle time.

A method for forming polymer in accordance with the present invention includes placing or injecting the polymer between the top mold surface and the bottom mold surface and heating the top mold surface via an induction heating unit. The top mold surface is heated to a predetermined temperature, for example the heat deflection temperature or the melt temperature of the polymer. Upon reaching the predetermined temperature, the method further includes cooling the polymer in preparation for ejection of the polymer part from the mold. The top and bottom mold surfaces can be further cooled by passing a liquid cooling medium through at least one of the top and bottom mold portions of the mold.

When the top mold surface is cooled to a predetermined ejection temperature, the mold is opened and the formed polymer part is ejected.

The top and bottom mold surfaces, as well as the polymer, can be further cooled by passing a liquid cooling medium through at least one of the top and bottom mold portions of the mold. When the top mold surface is cooled to a predetermined ejection temperature, the mold is opened and the formed polymer part is ejected.

In another example embodiment, the method further comprises passing a gas medium, for example air, through the top and bottom mold portions to purge the liquid cooling medium out of the mold during or after ejection of the polymer part from the mold. Purging the cooling medium with air allows the mold to be heated faster during and/or after ejection in preparation for the next polymer part to be formed, thereby reducing cycle time.

Polymer materials that may be processed in the mold apparatus described above may include, but are not limited to, thermoplastic, thermoset and mixtures thereof. Thermoplastic polymers can include, but are not limited to, polycarbonate (PC), polyetherimide (PEI), polyesters such as polyethylene terephthalate (PET) and polybutylene terephthalate (PBT), polyphenylene oxide (PPO), acrylonitrile butadiene styrene (ABS), acrylic styrene acrylonitrile (ASA), polypropylene (PP), polyethylene (PE), polyamides, and mixtures thereof, for example. Thermosetting polymers can include, but are not limited to, epoxy, phenolic, and polyester, for example. The polymers can be reinforced or non-reinforced with short, long or continuous carbon fibers, glass fibers, aramid, metallic, mineral or vegetable fibers.

While the invention has been described with reference to an exemplary embodiment, it will be understood by those skilled in the art that various changes may be made and equivalents may be substituted for unit thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A mold apparatus for forming polymer comprising:
   a first mold portion comprising a first mold surface which is magnetic;
   a second mold portion having an opposing mold surface that opposes the first mold surface when the apparatus is in use and wherein the second mold portion comprises an induction heating unit which provides induction heat energy to the mold apparatus and which is at least partially embedded in the second mold portion; and
   wherein the mold apparatus is constructed and arranged such that in use the polymer to be formed is positioned between the first mold surface of the first mold portion and the opposing mold surface of the second mold portion and wherein the mold apparatus is constructed and arranged to dissipate greater than 50% of the induction heat energy in the first mold portion.

2. The mold apparatus of claim 1, wherein the opposing mold surface comprises discrete areas of magnetic surfaces and non-magnetic surfaces.

3. The mold apparatus of claim 1, wherein the induction heating unit comprises a stator and at least one coil wound on the stator.

4. The mold apparatus of claim 3, wherein the at least one coil is wound around the stator in a transverse loop arrangement.

5. The mold apparatus of claim 3, wherein the stator comprises a material selected from: silicon steel, ferrite, permandur, hyperco, amorphous materials, and mixtures thereof.

6. The mold apparatus of claim 1, wherein the induction heating unit generates heat in a single phase.

7. The mold apparatus of claim 1, wherein the induction heating unit generates heat in multiple phases.

8. The mold apparatus of claim 1, wherein the induction heating unit comprises at least one coil and the at least one coil is configured in multiple phases and multiple poles.

9. The mold apparatus of claim 1, wherein the induction heating unit comprises at least one coil and the at least one coil is substantially equidistant to the first mold surface to provide substantially equal distribution of the magnetic flux created on the magnetic mold surface.

10. The mold apparatus of claim 9, wherein the pitch of the at least one coil is substantially constant to provide uniform magnetic field distribution along the first mold surface.

11. The mold apparatus of claim 1, wherein the power supplied to the induction heating unit is less than about 3 megawatts per square meter.

12. The mold apparatus of claim 1, wherein the first mold portion comprises no induction heating unit.

13. The mold apparatus of claim 1, wherein the first mold surface comprises a material selected from the group: iron, steel, carbon, magnesium and alloys thereof; and wherein the opposing mold surface of the second mold portion comprises another material selected from the group: cobalt-based materials, amorphous materials, ceramics, beryllium, glass, wood, polymers, copper, aluminum, non-magnetic stainless steel, and mixtures thereof.

14. The mold apparatus of claim 1, wherein the first mold surface comprises a magnetic material, and the opposing mold surface comprises a second material having a lower eddy current loss than the magnetic material.

15. The mold apparatus of claim 1, wherein the induction heating unit is located within 60 millimeters of the first mold surface to provide induction heat energy to the first mold surface.

16. The mold apparatus of claim 3, wherein the opposing mold surface comprises discrete areas of the stator.

* * * * *